United States Patent [19]
Ciszczon et al.

[11] Patent Number: 5,811,011
[45] Date of Patent: Sep. 22, 1998

[54] BIOLOGICAL TREATMENT OF WASTEWATER

[75] Inventors: Michael C. Ciszczon; Daniel E. Loy, both of Boca Raton; Charles R. Morgan, Ft. Lauderdale; Julio E. Moscoso, Coconut Creek; Anthony J. Nightingale, Boca Raton, all of Fla.

[73] Assignee: Parkson Corporation, Ft. Lauderdale, Fla.

[21] Appl. No.: 819,697

[22] Filed: Mar. 12, 1997

[51] Int. Cl.$^6$ ...................................................... C02F 3/20
[52] U.S. Cl. ...................... 210/620; 210/626; 210/195.3; 210/195.4; 210/220; 210/523
[58] Field of Search ............................. 210/195.3, 195.4, 210/202, 220, 258, 259, 232, 523, 524, 620, 624, 626

[56] References Cited

U.S. PATENT DOCUMENTS

| | | |
|---|---|---|
| 4,287,062 | 9/1981 | von Nordenskjold . |
| 4,797,212 | 1/1989 | von Nordenkjold . |
| 4,950,396 | 8/1990 | Skaar et al. ........................... 210/195.3 |
| 5,133,876 | 7/1992 | Tharp . |
| 5,217,609 | 6/1993 | Holdeman ............................. 210/195.3 |
| 5,217,617 | 6/1993 | Duncan et al. . |
| 5,316,671 | 5/1994 | Murphy . |
| 5,374,353 | 12/1994 | Murphy . |
| 5,472,611 | 12/1995 | von Nordenskjold et al. . |
| 5,490,920 | 2/1996 | Fruchtbaum et al. .................. 210/527 |
| 5,534,141 | 7/1996 | McAnaney et al. . |
| 5,569,376 | 10/1996 | Graves ................................ 210/195.4 |

*Primary Examiner*—Christopher Upton
*Attorney, Agent, or Firm*—Baker & Botts, L.L.P.

[57] ABSTRACT

In the embodiments of the invention described in the specification, an arrangement for biological treatment of wastewater includes a basin with an aeration region and a clarification region separated by a movable wall having a passage between the bottom of the wall and the bottom of the basin. The aeration region includes a plurality of diffuser arrangements for aerating the wastewater and the clarification region includes a sludge removal duct and at least one turbulence generator for periodically stirring up sludge particles which have been deposited on surfaces of the clarification region remote from the sludge removal duct and recirculating sludge through the wall passage to the aeration region and permitting sludge to resettle on surfaces closer to the sludge removal duct. The movable wall may be positioned to include one or more diffuser arrangements from the aeration region within the clarification region.

16 Claims, 3 Drawing Sheets

BIOLOGICAL TREATMENT OF WASTEWATER

BACKGROUND OF THE INVENTION

This invention relates to biological treatment of wastewater and, more particularly, to biological treatment processes and apparatus which include an aeration phase followed by a clarification phase and sludge removal from the clarification phase.

The von Nordenskjöld U.S. Pat. Nos. 4,287,062, 4,797,272 and 5,472,611, the disclosures of which are incorporated herein by reference, describe processes and apparatus for purification of wastewater in a basin in which the wastewater is supplied at one end of the basin and clarified water is removed from the opposite end. As described in those patents, an activated sludge aeration region of the basin includes bottom aerators consisting of air diffusers suspended from floating aeration lines which supply air under pressure to the diffusers. As air bubbles emerge from the diffusers, the resulting turbulence causes the diffusers to move back and forth in the basin which, in turn, causes the aeration lines to move along the surface of the water so that the entire aeration region of the basin is swept by the diffusers, aerating the waste water and stirring up any activated sludge which may have settled from the wastewater to the bottom of the aeration section.

After aeration in the aeration region, the wastewater passes beneath a separating wall into a clarification region where the wastewater is maintained in relatively quiescent condition, permitting sludge to settle from the wastewater to the bottom surface so that clarified liquid can be withdrawn from the top of the region. In order to remove the sludge from the bottom of the clarification region as described in U.S. Pat. No. 5,472,611, one or more sludge removal suction devices are arranged to move across the floor of the clarification region, continuously or periodically, to remove sludge which has settled to the bottom of the clarification region. Alternatively, as described in U.S. Pat. No. 4,287,062, the clarification region may have a bottom surface with a V-shaped trough in which sludge collects by gravity. A sludge recirculation duct extending along the bottom of the trough is connected to an airlift which draws sludge from the bottom of the trough and returns it to the aeration region. To dislodge and stir up sludge which has been deposited on the bottom and side walls of the clarification region, a sweeper chain assembly is dragged along the surface of that region periodically.

Such arrangements for removing sludge from a clarification region are complex and expensive and are inefficient in terms of power requirements.

The Murphy U.S. Pat. Nos. 5,316,671 and 5,374,353 disclose a wastewater treatment arrangement in which aeration and decanting take place in succession in a single basin without any separating wall. No arrangement for removing sludge deposited in the basin is provided and there is no recirculation of sludge from a clarification region to an aeration region.

SUMMARY OF THE INVENTION

Accordingly, it is an object of the present invention to provide an apparatus and a process for biological treatment of wastewater which overcome the above-mentioned disadvantages of the prior art.

Another object of the invention is to provide an apparatus and a process for biological treatment of wastewater in which sludge is conveniently and effectively removed from a clarification region in a simple, efficient and inexpensive manner.

These and other objects of the invention are attained by providing a wastewater treatment arrangement including an aeration region and a clarification region separated by a dividing wall having an opening to permit wastewater to pass from the aeration region to the clarification region, the clarification region having surfaces on which sludge particles are deposited during operation of the system, along with a sludge removal duct for removing sludge from the clarification region, and at least one turbulence generating arrangement located in the clarification region to produce turbulence periodically so as to cause sludge deposited on the surfaces of the clarification region remote from the sludge removal duct to be stirred up, permitting some of the sludge particles to pass through the wall opening back to the aeration region and other sludge particles to resettle on other surface portions in the clarification region so as to be accessible to the sludge removal duct. Preferably, the turbulence generating arrangement includes an air diffuser arrangement and, desirably, the air diffuser arrangement is similar to air diffuser arrangements provided in the aeration region. The dividing wall between the aeration region and the clarification region has an opening at the bottom and preferably is movably mounted in the basin to permit adjustment of the relative volumes of the aeration region and the clarification region. In addition, an air lift is preferably provided to withdraw sludge through the sludge removal duct for recirculation to the aeration region.

BRIEF DESCRIPTION OF THE DRAWING

Further objects and advantages of the invention will be apparent from a reading of the following description in conjunction with the accompanying drawings in which.

DESCRIPTION OF PREFERRED EMBODIMENTS

Figure 1:
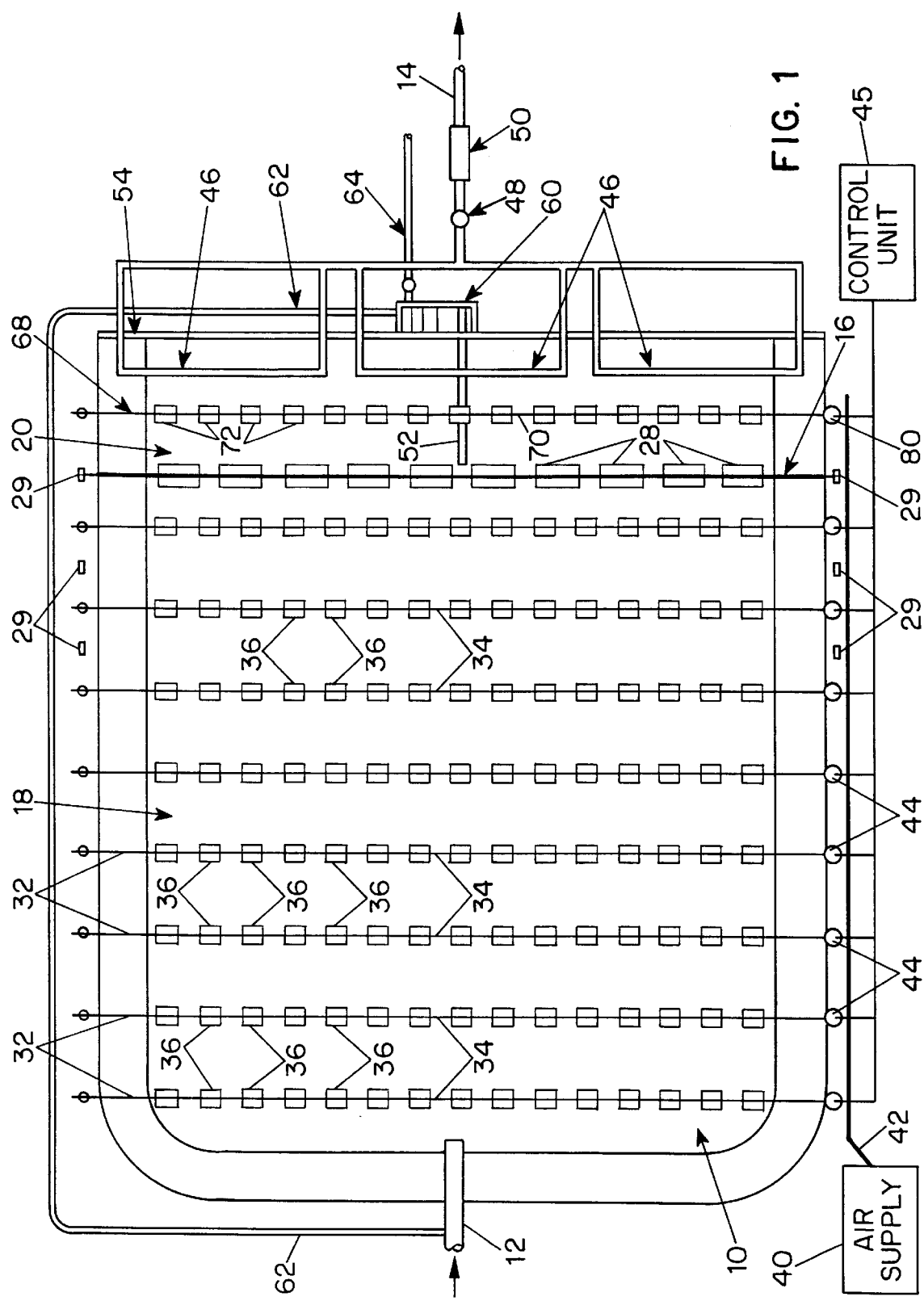
FIG. 1 is a plan view showing a representative embodiment of an arrangement for biological treatment of wastewater in accordance with the invention.
Figure 2:
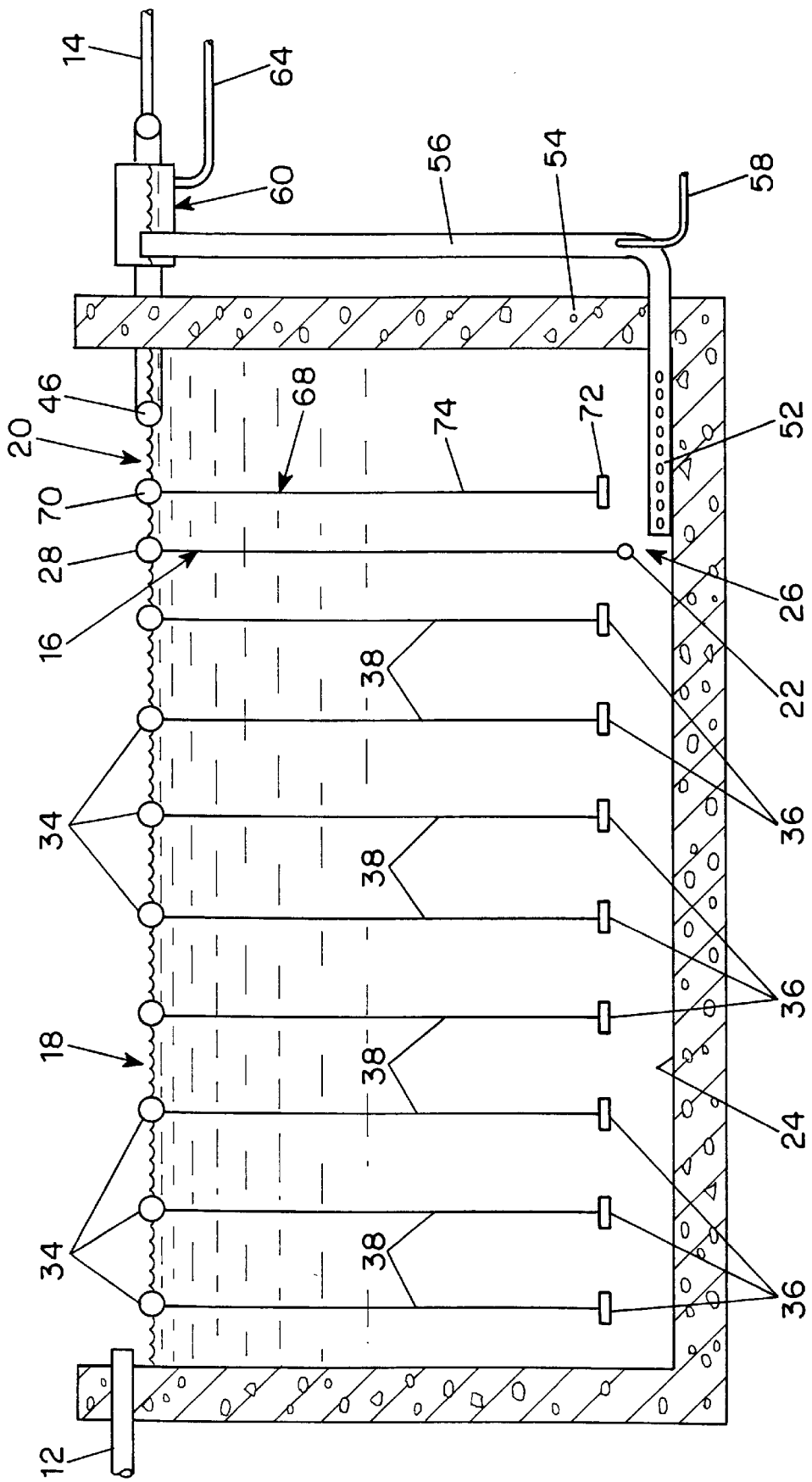
FIG. 2 is a vertical sectional view of the arrangement, shown in FIG. 1.

In the typical embodiment of the invention shown in FIGS. 1 and 2, an arrangement for biological treatment of wastewater includes a basin 10 having an inlet 12 for wastewater and an outlet 14 for clarified effluent. Within the basin 10, a wall 16 separates the basin into an aeration region 18 and a clarification region 20 and, as best seen in FIG. 2, the wall 16 has a bottom edge 22 disposed a short distance above the bottom surface 24 of the basin, leaving a passage 26 to permit wastewater to flow from the aeration zone 18 to the clarification zone 20. Preferably, the bottom edge 22 of the wall 16 is maintained at a distance of, for example, about 1–5 feet from the bottom surface of the basin to allow aerated wastewater to pass into the clarification region without producing turbulence in that region.

In the illustrated embodiment, the wall 16 is a movable wall in accordance with the von Nordenskjöld U.S. Pat. No. 5,472,611 and is preferably in the form of a flexible curtain suspended by a series of floats 28 and releasably anchored in one of several sets of mounts 29 disposed at the opposite sides of the basin, thereby permitting relocation of the wall so as to vary the relative volumes of the aeration region 18 and the clarification region 20 as needed. To maintain the bottom edge 22 of the wall in position, that edge may be weighted or it may be anchored by lines connecting it to the bottom or side walls of the basin.

Within the aeration region 18 an array of aerator chains 32 is suspended across the basin 10 from one side to the opposite side transversely to the direction of flow of the wastewater through the basin. The aerator chains 32 are preferably of the type described in the above-mentioned von Nordenskjöld patents and each chain includes a flexible floating air line 34 from which air diffusers 36 are suspended by vertical air lines 38 close to the bottom surface 24 of the basin, as shown in FIG. 2. The air lines 38 supply air to the diffusers 36 from an air supply 40 which is connected by a manifold 42 to the flexible floating air lines 34 in each of the aeration chains which are connected to the pipes 38. Each of the air lines 34 is connected through a valve 44 to the manifold 42 to permit automatic control of the air supply to the diffusers 36 in each of the chains by a control unit 45.

As described in the von Nordenskjöld patents, the aeration chains 32 are anchored on opposite sides of the basin but are supported with enough slack to permit lateral motion of the chains as the diffusers sweep 36 across the bottom 24 of the aeration zone in response to the liquid currents generated by emission of air bubbles from the diffusers. As a result, the wastewater to be treated in the aeration zone is thoroughly saturated with air and activated sludge particles carried by the wastewater in the aeration zone are thoroughly mixed with the wastewater to provide biological purification. Alternatively, if desired, aeration may be carried out in the aeration region in any other conventional manner. For example, one or more of the aeration diffuser chains in the aeration region may be replaced by other diffuser arrangements, such as fixed diffusers mounted in the floor of the basin.

In the clarification region 20, the water is normally maintained in a relatively quiescent state so that the sludge particles carried by the wastewater passing into the region through the opening 26 beneath wall 16 are permitted to settle on the bottom surface 24. Clarified water is removed from the top surface of the clarification region by floating weirs 46 which may be of the type described in the above-mentioned von Nordenskjöld U.S. Pat. No. 4,287,062. In the illustrated embodiment, three floating weirs 46 are shown but a larger or smaller number of floating weirs may be used if desired. The effluent clarified water removed by the floating weirs 46 passes through an automatic flow control valve 48 and a Parshall flume 50 as shown in FIG. 1. If desired, other arrangements for removing clarified liquid from the clarification region and other flow control arrangements may be substituted.

In order to remove sludge which has settled to the bottom surface 24 of the clarification region 20, a sludge removal pipe 52 is centrally positioned on the bottom surface and extends longitudinally out of that region through an end wall 54 of the basin. Outside the end wall, the sludge removal pipe 52 has a vertical section 56 and, in the illustrated embodiment, an air injection pipe 58 injects air into the pipe 56, causing it to operate as an airlift, thereby withdrawing sludge through the sludge removal duct 52 from the adjacent regions at the bottom of the clarification region 20. Alternatively, any other form of sludge transport arrangement, such as a mechanical pump or an archimedes screw may be used. The sludge thus removed is deposited from the airlift into a trough 60 from which a portion of the sludge may be recirculated through a pipe 62 to the inlet 12 for wastewater and the remainder is transported through a pipe 64 as waste.

In accordance with the invention, sludge particles which have settled on the bottom surface 24 of the clarification region 20 at locations remote from the sludge removal duct 52 and which are therefore inaccessible to the sludge removal system are periodically stirred up and circulated within the clarification region by at least one air diffuser located in the clarification region. In the embodiment illustrated in FIG. 1, one chain 68 of air diffusers extending across the clarification region is provided. The chain 68 is preferably constructed in a manner similar to the aeration chains 32 in the aeration region. Thus, the chain 68 is supported by a floating air line 70 at the surface of the liquid in the clarification region and has a plurality of air diffusers 72 suspended from vertical air lines 74 adjacent to the bottom surface 24 of the clarification region. The air line 70 is connected to the manifold 42 through a control valve 80 to supply air to the air diffusers 72 through the air lines 74. Alternatively, any other conventional type of turbulence-producing arrangement may be provided in the clarification region. For example, one or more air diffusers permanently mounted at or adjacent to the bottom of that region, or a conventional floating or submersible mixing device which produces turbulence in the liquid, may be provided.

In the illustrated embodiment, air is supplied by the valve 80 to the air diffusers 72 in the clarification region only periodically and only with sufficient pressure and for a time period long enough to provide enough turbulence to stir up the sludge which has been deposited on the bottom surface 24 and other surfaces of the clarification region at locations remote from the sludge removal pipe 52. When this has been accomplished, the air supply to the diffusers is discontinued and the sludge particles are permitted to resettle so that a substantial proportion of the redistributed sludge will be accessible to the sludge removal pipe 52. Furthermore, the turbulence produced by the air diffusers arrangement in the clarification region is also effective to cause a significant proportion of the sludge particles stirred up from the bottom surface 24 to be returned to the aeration region 18 through the opening 26 to participate in the biological treatment carried out in that region.

In some cases, the proportion of sludge particles stirred up by the air diffuser arrangement in the clarification region which is recirculated beneath the partition wall from the clarification region to the aeration region may be as high as 30 percent to 50 percent or more. This reduces the necessity for reliance upon a conventional sludge recirculation system and, in some cases, may eliminate the necessity for such a system.

While the air diffusers in the clarification region are being supplied with air to stir up sludge particles, the automatic flow valve 48 in the effluent line is closed so as to prevent stirred up sludge particles from being withdrawn through the effluent line. After sufficient time has been allowed for resettling of sludge particles remaining in the clarification zone, the automatic valve 48 is opened to permit resumed flow of effluent from the basin.

Throughout the process, the aeration treatment is carried out in the aeration zone regardless of whether air is being supplied to the air diffusers in the clarification zone. Thus, it is not necessary to interrupt the wastewater treatment process. Consequently, the wastewater treatment arrangement of the present invention can operate continuously, 24 hours a day, without interruption of the aeration process for decanting or clarification.

As noted above, the partition wall 16 is arranged to be movable and, since the chain 68 carrying the suspended air diffusers 72 in the clarification region in the embodiment illustrated in FIG. 1 has essentially the same structure as the aeration chains 32 in the aeration region, the movable wall 16 may be positioned between adjacent chains 32 in the aeration region 18 so as to cause one or more of those chains and their diffusers to be included within the clarification region 20. If necessary, any air diffusers so added to the clarification region can then be operated intermittently by the associated valves 44 in the same manner as the clarification region diffuser chain 68 for the purpose of stirring up deposited sludge from the bottom of the clarification zone rather than for aerating wastewater. Alternatively, the chains added to the clarification region in this manner may be kept inactive if sufficient turbulence is provided by the air diffusers normally located in the clarification region.

Figure 3:
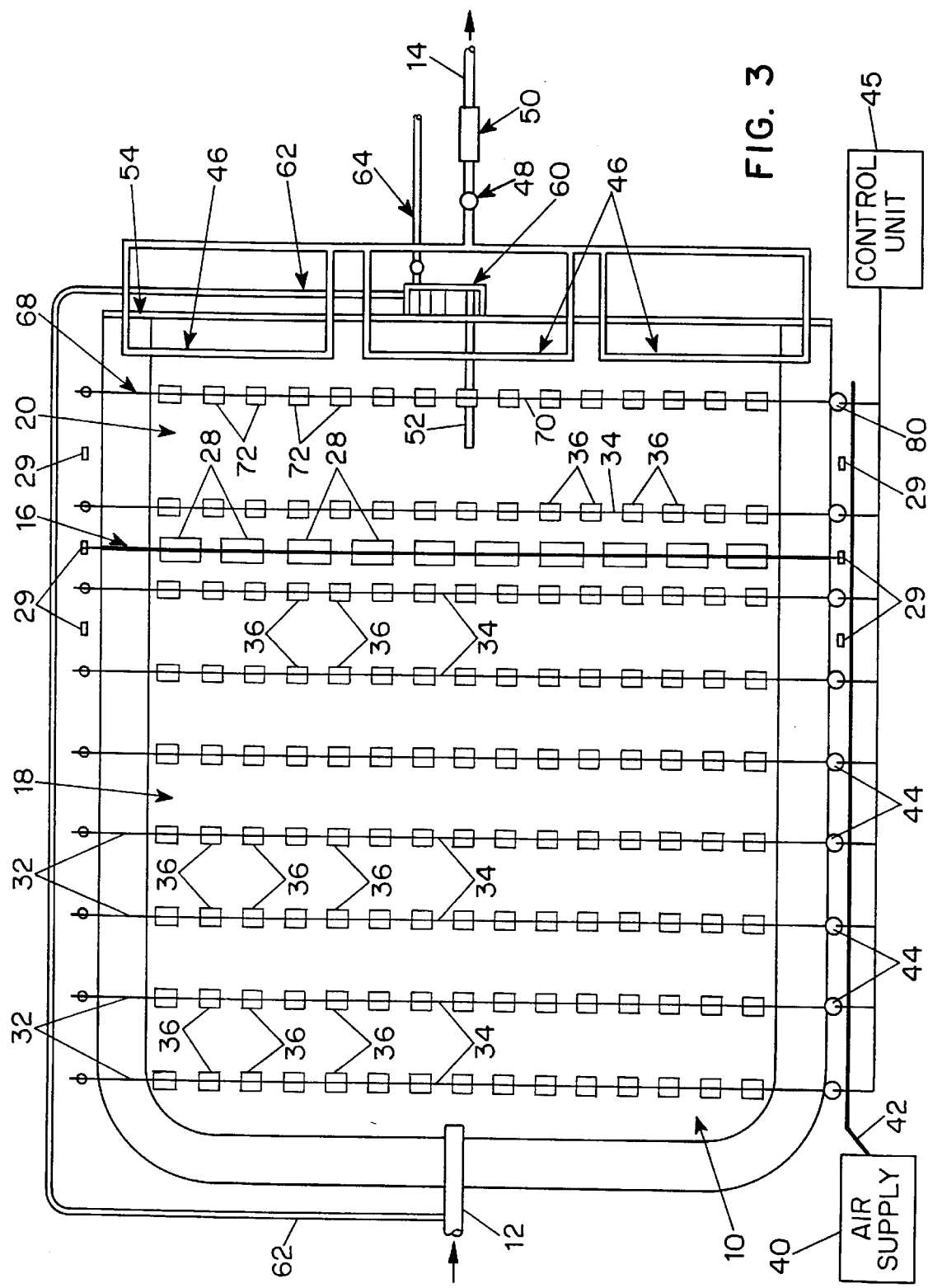
FIG. 3 is a plan view showing an arrangement similar to that of FIG. 1 in which the wall separating the aeration region and the clarification region has been moved to enlarge the volume of the clarification region and reduce the volume of the aeration region.

FIG. 3 illustrates an arrangement in which the wall 16 has been moved so as to include the last aeration chain 28 from the aeration region of FIG. 1 within the clarification region.

Although the invention has been described herein with reference to specific embodiments many modifications and variations therein will readily occur to those skilled in the art. Accordingly, all such variations and modifications are included within the intended scope of the invention.

We claim:

1. An arrangement for biological treatment of wastewater comprising:

a basin having a wastewater inlet at one end and an outlet for treated wastewater at another end;

an aeration region for aerating wastewater received in the basin;

a clarification region for clarifying aerated wastewater;

a wall separating the aeration region and the clarification region and providing a passage to permit aerated wastewater to pass from the aeration region into the clarification region;

a sludge removal arrangement in the clarification region having a fixed sludge removal duct to remove sludge which has settled from wastewater during clarification; and at least one array of air diffusers distributed across the clarification region for periodically stirring up sludge which has settle in the clarification region at locations laterally spaced from the fixed sludge removal duct to facilitate sludge removal by the fixed sludge removal duct.

2. An arrangement according to claim 1 wherein the wall separating the aeration region and the clarification region is a movable wall permitting the relative volumes of the aeration region and the clarification region to be changed.

3. An arrangement according to claim 2 wherein the aeration region includes a plurality of air diffuser arrays distributed across the aeration region and wherein the movable wall is movable so that at least one air diffuser array is included in either the aeration region or the clarification region.

4. An arrangement according to claim 1 wherein the air diffuser array in the clarification region comprises:

a chain of diffusers suspended across the clarification region, each of the diffusers being suspended from the surface of the liquid in the basin; and an air duct disposed to supply air to the diffusers from an air supply through a control valve.

5. An arrangement according to claim 1 wherein the aeration region includes:

a plurality of air diffuser arrangements extending across the aeration region, in which each of the air diffuser arrangements has a plurality of air diffusers adjacent to the bottom surface of the basin and suspended from a chain at the surface of the liquid in the basin.

6. An arrangement according to claim 5 wherein the air diffusers in the aeration region are suspended from a floating air duct and wherein the chain is supported for limited motion along the surface of the liquid in the basin to permit a sweeping action of the air diffusers adjacent to the bottom surface of the basin.

7. An arrangement according to claim 1 including;

an air lift for withdrawing sludge through the sludge removal duct; and sludge recirculation means for optionally recirculating to the basin inlet at least some of the sludge withdrawn by the sludge removal duct.

8. An arrangement according to claim 1 including:

a weir in the clarification region to remove clarified effluent therefrom.

9. An arrangement according to claim 1 including:

control means for controlling the operation of the array of air diffusers in the clarification region automatically.

10. An arrangement comprising:

a basin having a wastewater inlet at one end and an outlet for treated wastewater at another end;

an aeration region for aerating wastewater received in the basin;

a clarification region for clarifying aerated wastewater;

a wall separating the aeration region and the clarification region and providing a passage to permit aerated wastewater to pass from the aeration region into the clarification region;

a sludge removal arrangement in the clarification region to remove sludge which has settled from wastewater during clarification;

at least one turbulence generating arrangement in the clarification region for periodically stirring up sludge which has settled in the clarification region; and a movable wall separating the aeration region and the clarification region permitting the relative volumes of the aeration region in the clarification region to be changed;

wherein the movable wall comprises a flexible curtain supported from the surface of the liquid in the basin and having a weighted bottom edge.

11. An arrangement for biological treatment of waste water comprising:

a basin having a wastewater inlet at one end and an outlet for treated wastewater at another end;

an aeration region for aerating wastewater received in the basin;

a clarification region for clarifying aerated wastewater;

a wall separating the aeration region and the clarification region and providing a passage to permit aerated wastewater to pass from the aeration region into the clarification region;

a sludge removal arrangement in the clarification region to remove sludge which has settled from wastewater during clarification;

at least one turbulence generating arrangement in the clarification region for periodically stirring up sludge which has settled in the clarification region; and a movable wall separating the aeration region and the clarification region permitting the relative volumes of the aeration region and the clarification region to be changed;

wherein the movable wall comprises a flexible curtain supported from the surface of the liquid in the basin and having a bottom edge anchored to a basin wall.

12. An arrangement for biological treatment of waste water comprising:

a basin having a wastewater inlet at one end and an outlet for treated wastewater at another end;

an aeration region for aerating wastewater received in the basin;

a clarification region for clarifying aerated wastewater;

a wall separating the aeration region and the clarification region and providing a passage to permit aerated wastewater to pass from the aeration region into the clarification region;

a sludge removal arrangement in the clarification region to remove sludge which has settled from wastewater during clarification;

at least one turbulence generating arrangement in the clarification region for periodically stirring up sludge which has settled in the clarification region;

a weir in the clarification region to remove clarified effluent therefrom; and an effluent control arrangement to prevent effluent from being withdrawn from the clarification region when the turbulence generating arrangement in the clarification region is stirring up sludge in that region.

13. A method for biological treatment of wastewater comprising the steps of:

introducing wastewater into a basin;

aerating the wastewater with air diffusers in an aeration region of the basin;

passing the aerated wastewater to a clarification region of the basin;

clarifying the wastewater in the clarification region;

removing sludge from the clarification region through a sludge removal arrangement having a fixed sludge removal duct; and periodically activating an array of air diffusers at locations remote from the fixed sludge removal duct in the clarification region to stir up sludge which has settled in that region but has not been removed by the sludge removal duct to facilitate removal of sludge through the fixed sludge removal duct.

14. A method according to claim 13 wherein the aeration region includes a plurality of air diffuser arrangements and including the step of:

moving a wall separating the clarification region from the aeration region to a position such that at least one of the air diffuser arrangements previously included in the aeration region is in the clarification region.

15. A method according to claim 13 wherein the aeration region includes a plurality of air diffuser arrangements and including the step of:

moving a wall separating the clarification region from the aeration region to a position such that at least one air diffuser arrangement previously included in the clarification region is in the aeration region.

16. A method according to claim 13 wherein the aeration region and the clarification region are separated by a wall having an opening; and recirculating sludge through the opening from the clarification region to the aeration region by generating turbulence in the clarification region.

* * * * *